(No Model.)  T. GUNNING & J. QUIGLEY.  3 Sheets—Sheet 1.
WATER CLOSET.

No. 319,974. Patented June 16, 1885.

Witnesses
P. Hough
C. E. Jones

Inventors
Thomas Gunning
and James Quigley
By
Chas. J. Gooch
their Attorney.

(No Model.)   3 Sheets—Sheet 2.

T. GUNNING & J. QUIGLEY.
WATER CLOSET.

No. 319,974.  Patented June 16, 1885.

Witnesses
D. Hough
C. E. Jones

Inventors
Thomas Gunning
and James Quigley
By
Chas. J. Gooch
their attorney (No Model.) T. GUNNING & J. QUIGLEY.
WATER CLOSET.

No. 319,974. Patented June 16, 1885.

Witnesses
E. P. Hough
C. E. Jones

Inventors
Thomas Gunning
and James Quigley
By
Chas. J. Gooch
their attorney

UNITED STATES PATENT OFFICE.

THOMAS GUNNING AND JAMES QUIGLEY, OF NEW HAVEN, CONNECTICUT.

WATER-CLOSET.

SPECIFICATION forming part of Letters Patent No. 319,974, dated June 16, 1885.

Application filed April 3, 1884. (No model.)

*To all whom it may concern:*

Be it known that we, THOMAS GUNNING and JAMES QUIGLEY, citizens of the United States, residing at New Haven, in the county of New Haven and State of Connecticut, have invented certain new and useful Improvements in Water-Closets, of which the following is a specification, reference being had therein to the accompanying drawings.

This invention relates to certain improvements in the construction of water-closets, as will be hereinafter described and claimed.

Figure 1:
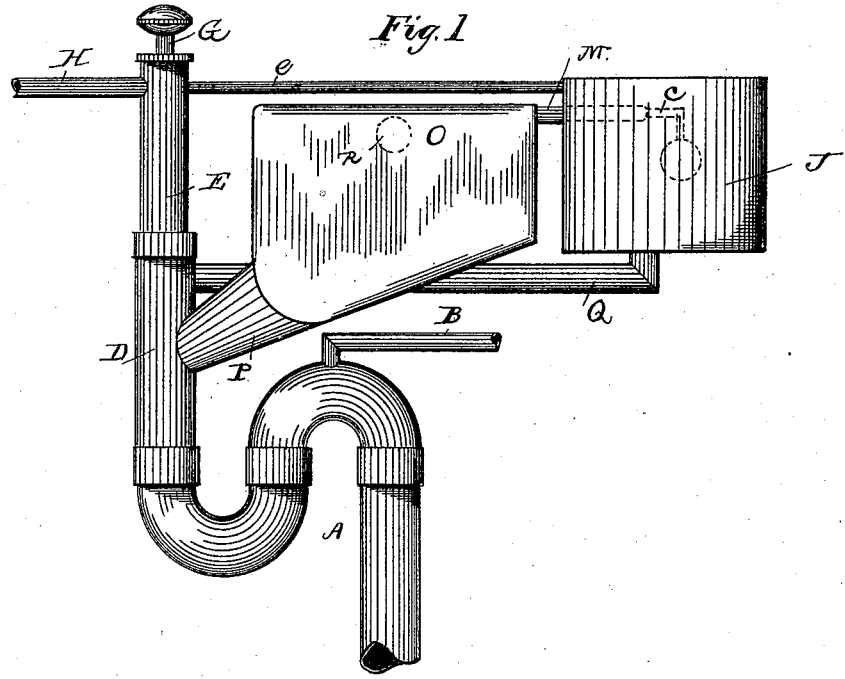
Figure 2:
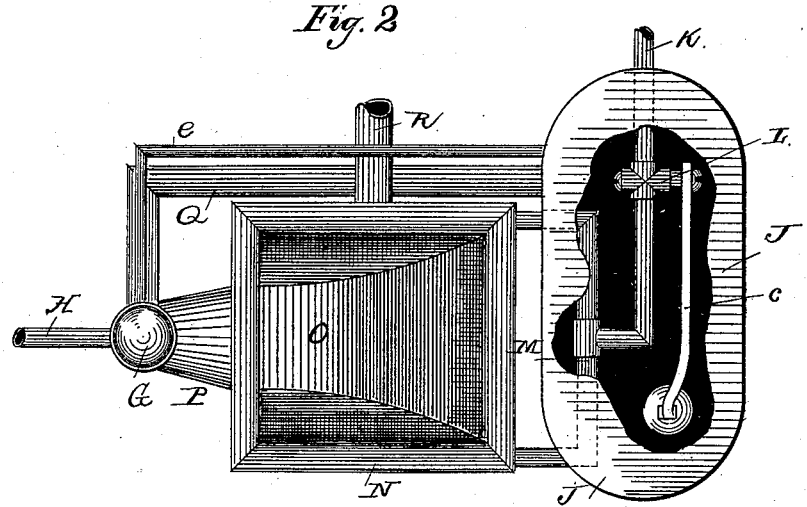
Figure 3:
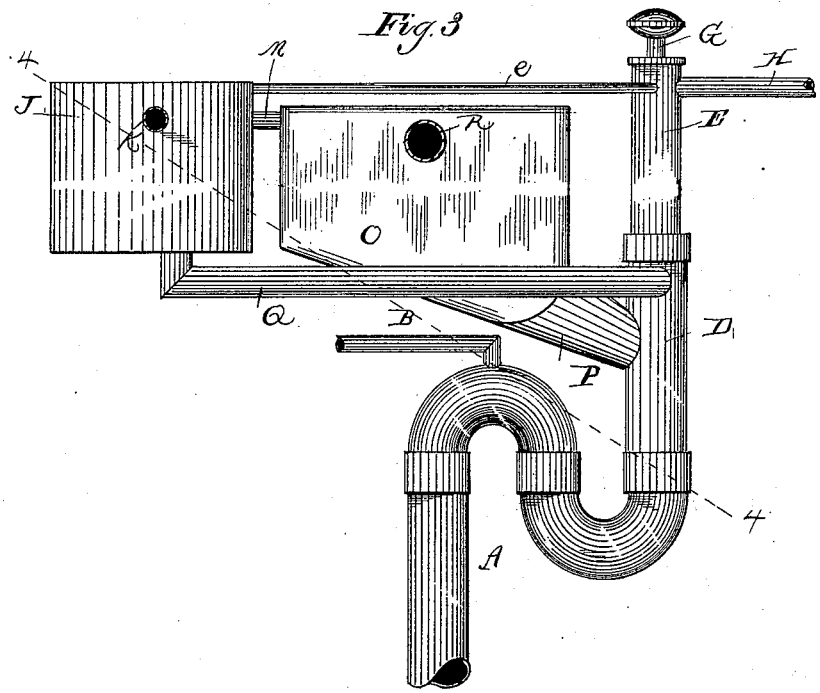
Figure 4:
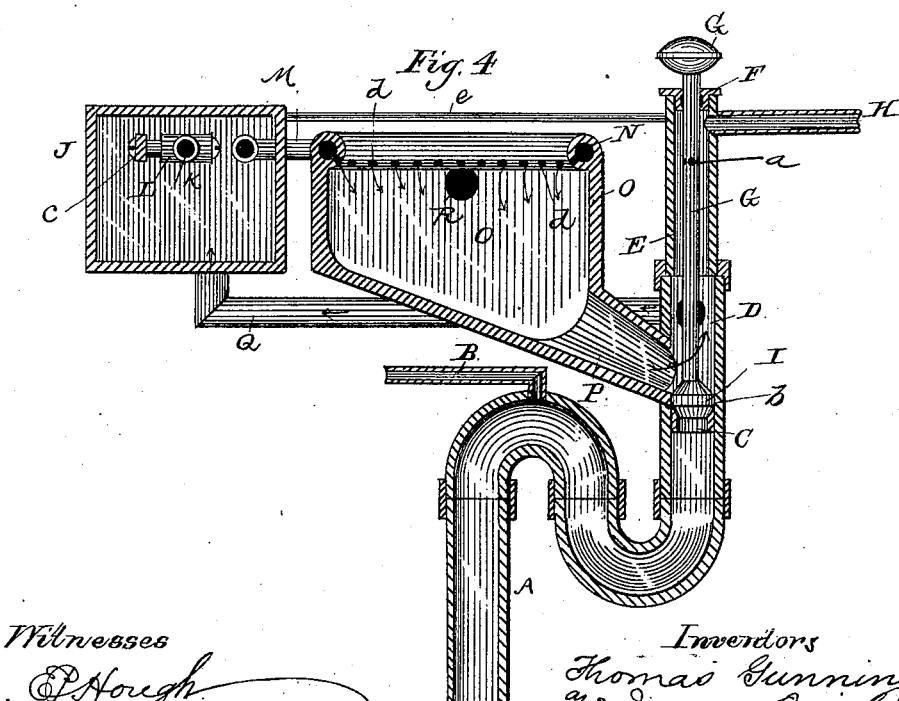
Figure 5:
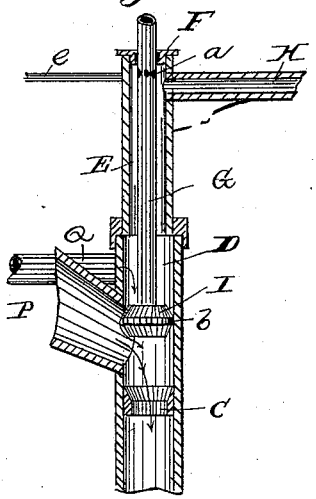
Figure 6:
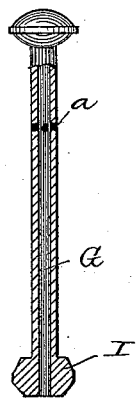

In the accompanying drawings, Figure 1 represents a side elevation of a closet constructed according to our improvements. Fig. 2 represents a top plan view thereof, partly broken away. Fig. 3 represents a side elevation similar to Fig. 1, but viewed from the opposite side. Fig. 4 represents a longitudinal vertical section, taken on the line 4 4, of Fig. 3, and Figs. 5 and 6 represent detail sectional views of parts of the apparatus.

It is the design of our invention to produce a water-closet wherein the bowl and chute, pipe and trap, through or along which the contents of the bowl pass, and the valve sealing the trap, shall be thoroughly flushed and kept clear of sediment, and the whole of the apparatus placed in connection with the atmosphere outside the building, and thus thoroughly ventilated.

To this end, referring to the accompanying drawings, A represents the trap, connecting with the sewer, and which is provided at its upper end with a ventilating-pipe, B, which extends rearwardly therefrom outside the building, preferably to the roof thereof, in order that all gases or foul air within said trap may have ready vent to the external atmosphere and the entrance of said gas or foul air within the building prevented.

C represents the valve-seat, located within the pipe D connecting the trap A with the stand-pipe E of the closet-pull. The stand-pipe E is attached by a ring, nut, or other suitable means to the upper end of the pipe D, and has at its upper end a stuffing-box, F, through and within which the valve-stem or pull G reciprocates vertically. By providing the stand-pipe with this stuffing-box F the stand-pipe will be sealed perfectly air-tight, and the passage therethrough of noxious odor prevented. From the upper portion of this stand-pipe E extends a ventilating-tube H, which connects with the outer atmosphere, for the purpose of conveying thereto any noxious odor that may at any time be in said standpipe. The valve-stem is, as shown in Fig. 6, hollow, and is provided near its upper portion with perforations *a*, through which vent is secured for the air beneath the valve-seat, which can thus pass up through said valve-stem and out of the perforations *a* into the ventilating-pipe H. These perforations also permit of the overflow, through the valve-stem, of any surplus water in the stand-pipe. The valve I is provided with a circumferential gasket *b*, of rubber or other suitable material, and has upper and lower conical faces, the lower one of which fits within a dish-shaped valve-seat when closed, the upper bevel or conical-shaped face of said valve preventing the settlement thereon of any soil in its passage from the bowl to the trap.

J represents a tank or reservoir, which may be situated either at the back or at the side of the pan opposite to that at which the valve-stem is situated.

K represents a pipe connecting with the water-supply, and having attached thereto a suitable ball-cock, L, by means of which the supply of water through the pipe K to the closet bowl and tank J may be automatically regulated. The arm or stem *c* of the valve may be slotted, so that said arm may be shortened or lengthened, by which means the standing height of the water within the tank or reservoir J and bowl O may be regulated, as by shortening said ball-stem *c* more water would be allowed to flow within said tank, and said ball operate to close the cock, than would be the case if the stem *c* were lengthened. The pipe K connects with a U-shaped pipe, M, whose ends extend to and connect with a tubular rim, N, of the bowl or pan O. This pan or bowl O is shown in the drawings as of rectangular form, but it may be made of any other shape or contour, as found most convenient or desirable. The tubular rim N has a series of angular perforations, *d*, extending entirely around the same, in order that the water passing from the pipe K to and through the pipe M to the rim N may flow within and thoroughly flush all the interior sides of the pan, thereby insuring the thorough cleansing thereof. When a sufficient flushing of the pan has been obtained, the valve-stem G is lowered so as to seat the valve, and thereby close the entrance to the trap A, whereupon the water passing within the pan O will pass down the chute P to and through the pipe D to and along the pipe Q and into the tank or reservoir J, as indicated by the arrows in Fig. 4. This circulation of the water will continue until the desired level is obtained within the tank, said level being regulated by the adjustment of the ball-stem $c$, as before mentioned, at which time the level of the water within the tank or reservoir J and the pan O will be equal. When the plunger is raised for emptying the pan O, the valve is raised above that portion of the pipe D with which the pipe Q connects, by which means not only will the contents of the pan be discharged through the trap A, but the contents of the reservoir or tank J will also be discharged down the pipe D and the trap A, and as the water within the tank J will commence to flow out from the pipe Q to the pipe D after the discharge of the pan or bowl O, the valve-stem G, valve I, and pipe D, and the trap A will be thoroughly washed by the water passing from said reservoir through the pipe Q.

$e$ represents a ventilating-pipe connecting the upper portion of the tank or reservoir J with the vent-pipe H, for the purpose of insuring the removal from said tank of any foul odors that may be therein.

R represents a pipe or tube connecting at one end with the bowl O and at the other end with the outer atmosphere, for the purpose of securing the ventilation of the bowl while in use.

It will thus be seen that every part of the apparatus is in direct connection with the outer atmosphere, and that, therefore, the escape thereto of all noxious odors is adequately provided for, and that the adequate flushing with water of all parts of the apparatus, where such is desirable, is effectually secured.

By providing the trap with the back air-pipe, B, the siphoning of the trap is prevented. The vent-pipe $e$, besides serving to ventilate the tank J, also serves to admit air from the vent-pipe H to said tank upon the water being discharged therefrom, and to admit of the air in said tank passing therefrom to the vent-pipe H, as it is displaced by the entrance of water therein. This pipe $e$ is essential, as the tank J is hermetically closed, except at the top.

Having thus described our invention, what we claim, is—

1. In a water-closet, the combination, with a suitable bowl and trap and means for flushing the same, of a stand-pipe connected with the trap, and having a ventilating-pipe connected with the outer atmosphere, and a stuffing-box for the valve-plunger, and a valve having a hollow plunger provided with perforations at its upper portion, substantially as and for the purpose set forth.

2. The water-closet herein described, consisting of a bowl having a ventilating-pipe and a hollow and perforated rim, a water-supply pipe connected with said hollow rim, a stand-pipe connected with the trap and having at its upper portion a ventilating-pipe, and a stuffing-box for the valve-stem or plunger, a hollow-valve plunger having perforations at or near its upper part, a water reservoir or tank having at its upper portion a ventilating-pipe and at its lower portion a pipe connecting said tank with the trap, whereby the trap or valve may be flushed on the raising of the valve and the tank supplied with water, and a trap having a ventilating-pipe, substantially as and for the purpose set forth.

In testimony whereof we affix our signatures in presence of two witnesses.

THOMAS GUNNING.
JAMES QUIGLEY.

Witnesses:
H. W. SMITH,
CHAS. CURTISS.